US010635160B2

(12) United States Patent
Martinez et al.

(10) Patent No.: US 10,635,160 B2
(45) Date of Patent: Apr. 28, 2020

(54) STEPBACK MECHANISM TO DEVELOP AND DIAGNOSE PROCESS APPLICATIONS

(71) Applicant: TIBCO Software Inc., Palo Alto, CA (US)

(72) Inventors: Francisco Martinez, Somerville, MA (US); Michael Register, Deerfield, NH (US); Rajeev Kozhikkattuthodi, San Jose, CA (US)

(73) Assignee: TIBCO SOFTWARE INC., Palo Alto, CA (US)

( * ) Notice: Subject to any disclaimer, the term of this patent is extended or adjusted under 35 U.S.C. 154(b) by 150 days.

(21) Appl. No.: 15/417,635

(22) Filed: Jan. 27, 2017

(65) Prior Publication Data
US 2017/0329583 A1 Nov. 16, 2017

Related U.S. Application Data

(60) Provisional application No. 62/337,156, filed on May 16, 2016.

(51) Int. Cl.
| | |
|---|---|
| *G06F 9/45* | (2006.01) |
| *G06F 3/00* | (2006.01) |
| *G06F 8/60* | (2018.01) |
| *G06F 8/30* | (2018.01) |
| *G06F 11/00* | (2006.01) |
| *G06F 8/41* | (2018.01) |

(52) U.S. Cl.
CPC ............... *G06F 3/00* (2013.01); *G06F 8/30* (2013.01); *G06F 8/433* (2013.01); *G06F 8/60* (2013.01); *G06F 11/00* (2013.01); *G06F 8/41* (2013.01)

(58) Field of Classification Search
CPC ......... G06F 17/30038; G06F 17/30899; G06F 9/5083; G06F 8/31; G06F 9/45504; G06F 16/2477; G06F 9/4887; G06F 9/5072; G06F 11/00; G06F 3/00; G06F 8/41; H04L 43/0811; H04L 29/08846; H04L 47/70; G06Q 10/0633; G06Q 10/10; G06Q 10/06
See application file for complete search history.

(56) References Cited

U.S. PATENT DOCUMENTS

| | | | |
|---|---|---|---|
| 5,675,803 A | 10/1997 | Preisler | |
| 6,202,199 B1 | 3/2001 | Wygodny | |
| 7,685,253 B1 | 3/2010 | Valia | |
| 9,569,255 B1 * | 2/2017 | Johnson | ................. G06F 9/4887 |
| 2001/0032108 A1 * | 10/2001 | Sieron | .................... G06Q 10/06 717/100 |
| 2004/0078105 A1 * | 4/2004 | Moon | .................... G06Q 10/10 700/100 |
| 2005/0251794 A1 | 11/2005 | Taylor | |
| 2006/0074736 A1 * | 4/2006 | Shukla | .................... G06Q 10/06 717/100 |
| 2008/0281944 A1 * | 11/2008 | Vorne | ................. H04L 29/08846 709/218 |

(Continued)

*Primary Examiner* — Tuan A Vu
(74) *Attorney, Agent, or Firm* — McGuireWoods LLP

(57) ABSTRACT

One or more inputs associated with a selected step of a process flow are modified. The process flow is executed from the selected step based on the modified one or more inputs. A data record associated with selected step is updated to reflect the modified one or more inputs. A process application that includes the process flow is compiled into an executable and deployed to a device.

20 Claims, 8 Drawing Sheets

(56) References Cited

U.S. PATENT DOCUMENTS

| | | | |
|---|---|---|---|
| 2009/0164606 A1* | 6/2009 | Epifania | G06F 17/30899 |
| | | | 709/219 |
| 2012/0079013 A1* | 3/2012 | Shepstone | G06F 17/30038 |
| | | | 709/203 |
| 2012/0271926 A1* | 10/2012 | Shakirzyanov | G06F 9/5072 |
| | | | 709/220 |
| 2013/0338980 A1 | 12/2013 | Paul | |
| 2014/0282367 A1* | 9/2014 | Harrill | G06F 8/31 |
| | | | 717/105 |
| 2016/0112262 A1* | 4/2016 | Johnson | G06F 9/45504 |
| | | | 709/221 |
| 2016/0124742 A1* | 5/2016 | Rangasamy | H04L 47/70 |
| | | | 717/103 |
| 2017/0090995 A1* | 3/2017 | Jubinski | G06F 9/5083 |
| 2017/0169114 A1* | 6/2017 | Ben-Tzur | G06F 16/2477 |
| 2017/0255886 A1* | 9/2017 | Schmidt | G06Q 10/0633 |
| 2018/0069774 A1* | 3/2018 | Li | H04L 43/0811 |

* cited by examiner

STEPBACK MECHANISM TO DEVELOP AND DIAGNOSE PROCESS APPLICATIONS

CROSS REFERENCE TO OTHER APPLICATIONS

This application claims priority to U.S. Provisional Patent Application No. 62/337,156 entitled STEPBACK MECHANISM TO DEVELOP AND DIAGNOSE PROCESS APPLICATIONS filed May 16, 2016 which is incorporated herein by reference for all purposes.

BACKGROUND OF THE INVENTION

Process engines that execute a process application can be deployed to a device. The process application was designed to behave in a particular manner, but for some unknown reason, the process application does not behave as expected. One possible solution is to simply replace the device, but such a solution may be impractical or costly, and does not solve the underlying problem associated with the process application.

BRIEF DESCRIPTION OF THE DRAWINGS

Various embodiments of the invention are disclosed in the following detailed description and the accompanying drawings.

DETAILED DESCRIPTION

Figure 1:
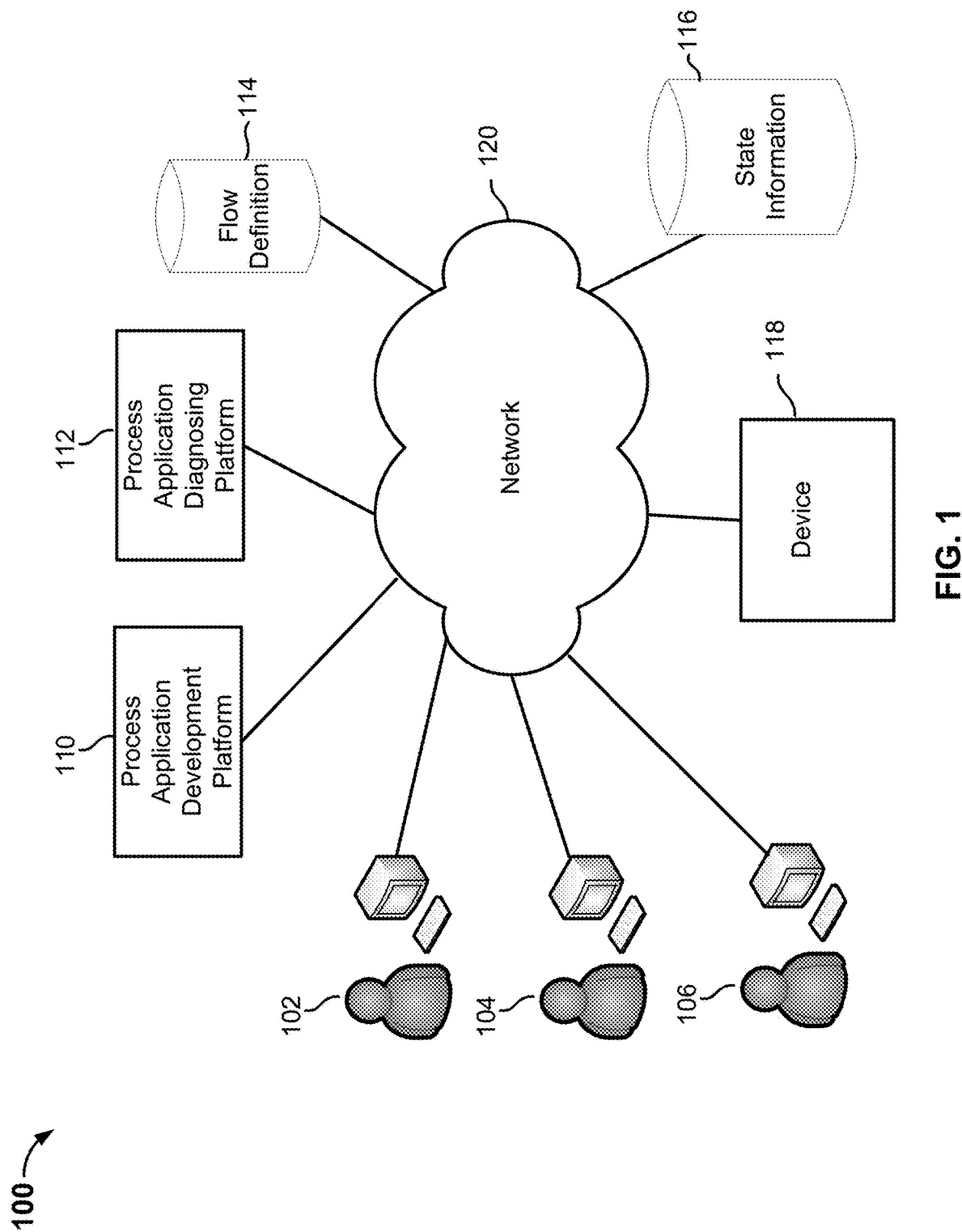
FIG. 1 is a block diagram illustrating an embodiment of a system for developing and diagnosing process application through the use of a step back mechanism.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

A step back mechanism to develop and diagnose process applications is disclosed. In some embodiments, an instance of a process engine running on a device is configured to execute a process application, but unexpectedly produces an erroneous behavior. A process application includes one or more process flows. Each process flow is comprised of a series of steps, such as an activity to log message followed by one or more activities. Data values that are changed, i.e., state transitions, during execution of a step of the process flow are recorded and stored locally. Subsequently the data values that are changed are transmitted and stored in a remote state information database. A definition of the process application and the recorded state values associated with the instance of the process engine are obtained by a process application diagnosing platform. The process application diagnosing platform includes a step back mechanism and is configured to recreate the process engine that executed on the device with the associated state values. The step back mechanism enables operators to backtrack through the steps of the one or more process flows associated with the process application. Operators can not only inspect the recorded state at each step of a process flow, but also adjust any data value associated at any step and determine the impact of the adjusted data value on subsequent steps of the process flow without having to execute the process application from the beginning of the process application. An operator can make one or more adjustments to the process flow to achieve a desired result. When the operator has adjusted the process flow in a manner that causes the process flow to achieve the desired result, the process application can be updated to reflect the adjustment. Subsequently, the process application can be recompiled and redeployed to the device. This allows malfunctioning devices to be repaired without having to completely replace the device, which in some situations can be costly or impractical.

In other embodiments, a process engine to execute a process application can be developed using a process application development platform. The process application development platform is configured to enable a developer to create a process application and also includes a step back mechanism that enables the developer to make one or more adjustments to any step of a process flow and to determine the impact of the one or more adjustments on subsequent steps of the process flow without having to execute the process application from the beginning of the process application. When the developer has adjusted the process flow in a manner that causes the process flow to achieve the desired result, the process application can be stored to reflect the adjustment. The process application can be pre-compiled to determine a minimal set of components necessary to execute the process application and unnecessary components are removed. Subsequently, the process application can be compiled into an executable and deployed to a device.

FIG. 1 is a block diagram illustrating an embodiment of a system for developing and diagnosing process application through the use of a step back mechanism. In the example shown, the system 100 includes a process application development platform 110, a process application diagnosing platform 112, a flow definition database 114, a state information database 116, a device 118, and a network 120.

Process application development platform 110 is a platform that allows an integrator 104 to create a custom process engine that invokes a process application. An integrator 104 may be an entity, such as a software developer, that creates via process application development platform 110 a process application comprised of one or more process flows for a specific purpose. For example, the integrator may create a process flow for a device to perform a system update, to perform a specific function, to perform a diagnostic test, etc. Each process flow is comprised of a series of steps, such as an activity to log message followed by one or more activities. The integrator can select a trigger to initiate a process flow and one or more activities to be invoked after the trigger. The integrator can create a second process flow that branches off from an activity of the first process flow or can create a second process flow that is based on the output of the trigger. The triggers and activities may be defined by individual sets of code, which may include references to libraries, components, and/or functions.

Developer 102 may be a person or other entity (e.g., software developer) that creates activities and triggers via process application development platform 110. Developer 102 may create an activity and/or a trigger using an activity and trigger creator. Each activity and trigger created by a developer may be a self-contained piece of code functionality that is created via a programming language, such as Go, Python, C, C++, etc. The triggers and activities may be created by a plurality of developers, each of the developers unaware of how the triggers and activities will be combined, e.g., by others at a later time, to form a process flow.

Operator 106 may be a person or other entity (e.g., software developer) that diagnoses process applications. Operator 106 may resurrect a failed instance of a process engine by selecting a file to be retrieved from flow definition database 114 and the associated recorded state transitions associated with the process engine to be retrieved from a state information database 116. In some embodiments, the file can be a flow.json file, an XML file, or any other file that stores the flow definition. The associated recorded state transitions associated with the process engine can be identified via a unique identifier that is specific to the device that executed the failed instance of the process engine. Operator 106 is able to modify, via a user interface, a state value associated with a process application at any step and to view the impact of the modified state on subsequent steps without having to execute the process application from the beginning of the process application. Operator 106 is able to update the process application, such that the step is configured to output the modified state value in place of the original state value.

Process application diagnosing platform 112 is a platform that allows an operator 106 to retrieve a flow definition file associated with a device from flow definition database 114 and the associated recorded state transitions associated with the device from state information database 116. The flow definition can be stored in a manner that associates a specific flow definition with one or more devices. The flow definition file is a metadata description of the expected behavior associated with a process application. In some embodiments, the flow definition describes the relationships between the triggers and activities of a process application and how to perform the triggers and activities. In some embodiments, the flow definition describes the relationships between the activities of a process application and the behavior of the process application. In some embodiments, the flow definition file can be a flow.json file, an app.json file, an XML file, or any other file that stores the flow definition. The associated recorded state transitions describe at each step of the process application, the values associated with the triggers and activities of the process application. The associated recorded state transitions associated with the process engine can be identified via a unique identifier that is specific to the device that executed the failed instance of the process engine. Process application diagnosing platform 112 is configured to use the combination of the flow definition file and the associated recorded state transitions to recreate the process engine deployed to a device, such as device 118. Process application diagnosing platform 112 is configured to replay a process application from any step of the process application. Process application diagnosing platform 112 is configured to receive an indication to adjust a data value associated with any step of the process application and to adjust the data value. Process application diagnosing platform 112 is configured to play from a selected step the process application with the adjusted data value in place of the retrieved data value of the step. In some embodiments, process application diagnosing platform 112 is configured to replay a process application to a step prior to failure.

In some embodiments, processing application development platform 110 and process application diagnosing platform 112 can be combined into a single processing application development and diagnosing platform that is accessible by developers 102, integrators 104, and/or operators 106.

Flow definition database 114 is a database that stores files that describe the behavior of a process application. In some embodiments, the flow definition database 114 stores flow definition files, which describes the triggers of a process application, activities of a process application, relationship between the triggers and activities within a process application, and/or relationship between the activities within the process application. In some embodiments, there are many instances of a flow definition database 114 that are accessible via network 120. In some embodiments, the flow definition file can be a flow.json file, an app.json file, an XML, file, or any other file that stores the flow definition.

State information database 116 is a database that stores the state associated with a process engine being executed on a device, such as device 118. In some embodiments, all state values of a process application at each step are stored in state information database 116. In some embodiments, state values that are changed during a step of a process application are stored in state service database 116. In some embodiments, the state values are stored at the completion of each process application step. In some embodiments, the state values are stored at the beginning of each process application step.

Device 118 is a target device to execute a process engine. For example, the device 118 may be a mobile device, an interconnected device, an IoT device, a general purpose computer, or any device executing a process engine. After a process application is compiled, an executable process engine can be deployed to device 118. The process engine can be a general process engine or a custom process engine. The process engine, when executed by device 118, controls the behavior of the device. In some embodiments, device 118 stores all state values after each step of a process application is completed. In some embodiments, device 118 stores state transitions after each step of a process application is completed. In some embodiments, device 118 transmits the state transitions to state information database 116 after each step of a process application is completed. In other embodiments, device 118 periodically transmits the state transitions to state information database 116. In other embodiments, device 118 transmits the state transitions to state information database 116 upon request. In some embodiments, when device 118 loses connectivity to network 120, device 118 transmits the state transitions to state information database 116 upon re-establishing connectivity to network 120.

Network 120 connects process application development platform, process application diagnosing platform 112, flow service database 114, state service database 116, and device 118 to each other. Network 120 comprises one or more of the following: a local area network, a wired network, a wireless network, the Internet, an intranet, or any other appropriate communication network.

Figure 2A:
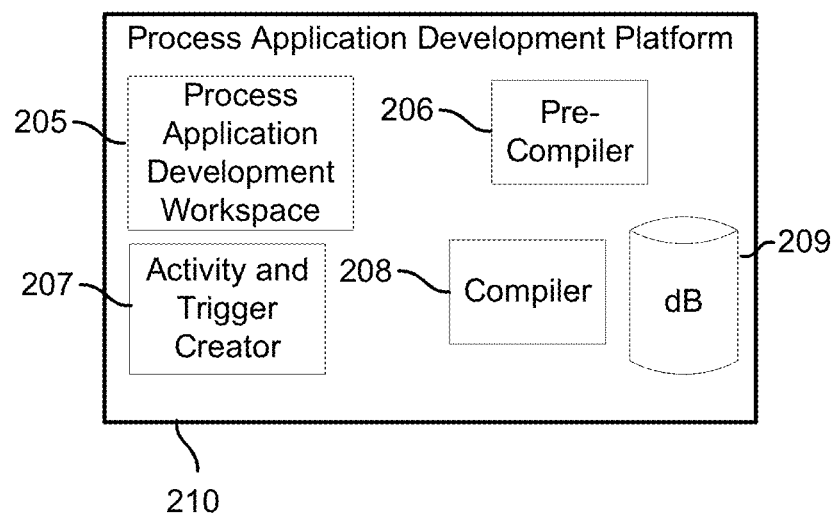
FIG. 2A a block diagram illustrating an embodiment of a process application development platform.

FIG. 2A a block diagram illustrating an embodiment of a process application development platform. In some embodiments, process application development platform 210 can be implemented using process application development platform 110.

Process application development platform 210 can include a process application workspace 205, a pre-compiler 206, an activity and trigger creator 207, a compiler 208, and/or a database 209. The process application development platform 210 may be implemented using one or more computing devices, such as a computer, a multi-processor system, a microprocessor-based system, a cloud-based system, a special purpose device, a distributed computing environment including any of the foregoing systems or devices, or other appropriate hardware/software/firmware combination that includes one or more processors, and memory coupled to the processors and configured to provide the processors with instructions.

Process application workspace 205 is a user interface that allows an integrator, such as integrator 104, to create one or more process flows that are to be included in a process application. In some embodiments, the one or more process flows can be created by a visual or a text editor. A process flow can include a trigger followed by one or more activities. In other embodiments, a process flow is comprised of one or more activities. Such a process flow can be associated with a trigger that is not part of the process flow definition. When a process flow is executed, the process flow is comprised of one or more steps. At each step of the process flow, each trigger and one or more activities have an associated state. Process application workspace 205 includes a step back mechanism that is configured to allow the integrator to modify one or more data values associated with any trigger and/or any activity at any step of the process flow and to execute the remaining steps based on the modified data values. Process application workspace 205 is configured to allow a user to modify and store a data record associated with a trigger and/or activity. The data record includes data values that are used by a trigger and/or activity.

Pre-compiler 206 is configured to analyze one or more process flows of a process application created by an integrator and to determine a minimal set of components needed to execute the process application. Compiler 208 is configured to compile the process application into an executable. The resulting compiled code is packaged and made available to be deployed (e.g., by download, etc.) as an executable binary. The executable when executed on a device, such as device 118, is a process engine that controls how the device 118 operates. Database 209 is configured to store activities and triggers created by one or more developers, such as developer 102. The database 209 may be a memory and/or storage device internal to process application development platform 210, a memory and/or device attached to process application development platform 210, any memory and/or storage device connected to process application development platform 210, via a network connection, or any combination thereof. The network connection may be a wired or wireless connection.

Figure 2B:
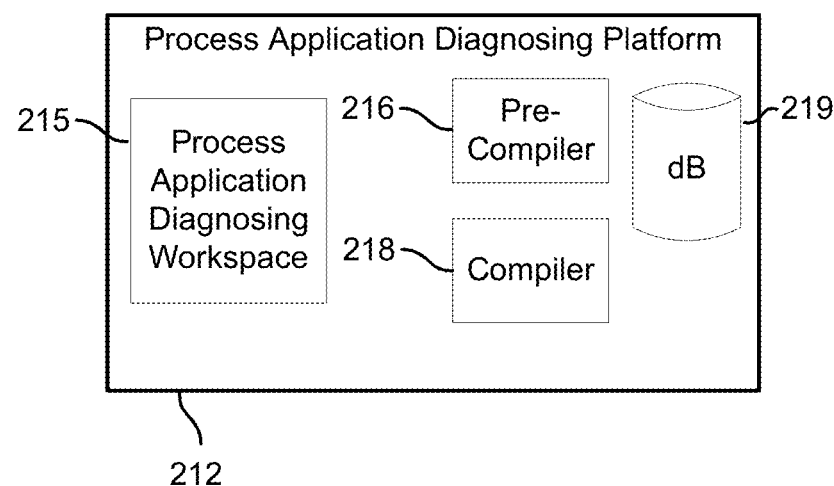
FIG. 2B is a block diagram illustrating an embodiment of a process application diagnosing platform.

FIG. 2B is a block diagram illustrating an embodiment of a process application diagnosing platform. In some embodiments, the process application diagnosing platform 212 can be implemented using processing application diagnosing platform 112.

Processing application diagnosing platform 212 can include a process application diagnosing workspace 215, a pre-compiler 216, a compiler 218, and/or a database 219. The process application diagnosing platform 210 may be implemented using one or more computing devices, such as a computer, a multi-processor system, a microprocessor-based system, a cloud-based system, a special purpose device, a distributed computing environment including any of the foregoing systems or devices, or other appropriate hardware/software/firmware combination that includes one or more processors, and memory coupled to the processors and configured to provide the processors with instructions.

Process application diagnosing workspace 215 is a user interface that allows an operator, such as operator 106, to retrieve one or more process flows associated with a process application deployed to a device from a flow definition database and to retrieve one or more state values associated with the retrieved process flows executed on the device from a state information database. Process application diagnosing workspace 215 includes a step back mechanism and is configured to receive one or more inputs that modify one or more data values associated with a process flow at a particular step in the process flow. Process application diagnosing workspace 215 is further configured to execute the process flow from that particular step with the modified value. Process application diagnosing workspace 215 is further configured to update the process application to output the modified state value instead of the stored state value. Process application diagnosing workspace 215 is further configured to store the updated process application to database 219 or to a remote flow definition database. The updated process application includes a data record that is comprised of the one or more modified data values that are used by a trigger and/or activity to produce the desired output.

Pre-compiler 216 is configured to analyze one or more process flows of a process application and to determine a minimal set of components needed to execute the process application. Compiler 218 is configured to compile the process application into an executable. The resulting compiled code is packaged and made available to be re-deployed (e.g., by download, etc.) as an executable binary. The executable when executed on a device, such as device 118, is a process engine that controls how the device operates. Database 219 stores the activities and triggers modified by one or more operators, such as operator 106. Database 219 may be a memory and/or storage device internal to process application development platform 212, a memory and/or device attached to process application development platform 212, any memory and/or storage device connected to process application development platform 212, via a network connection, or any combination thereof. The network connection may be a wired or wireless connection. In some embodiments, the modified process application definition is transmitted to a remote database, such as flow definition database 114.

Figure 3:
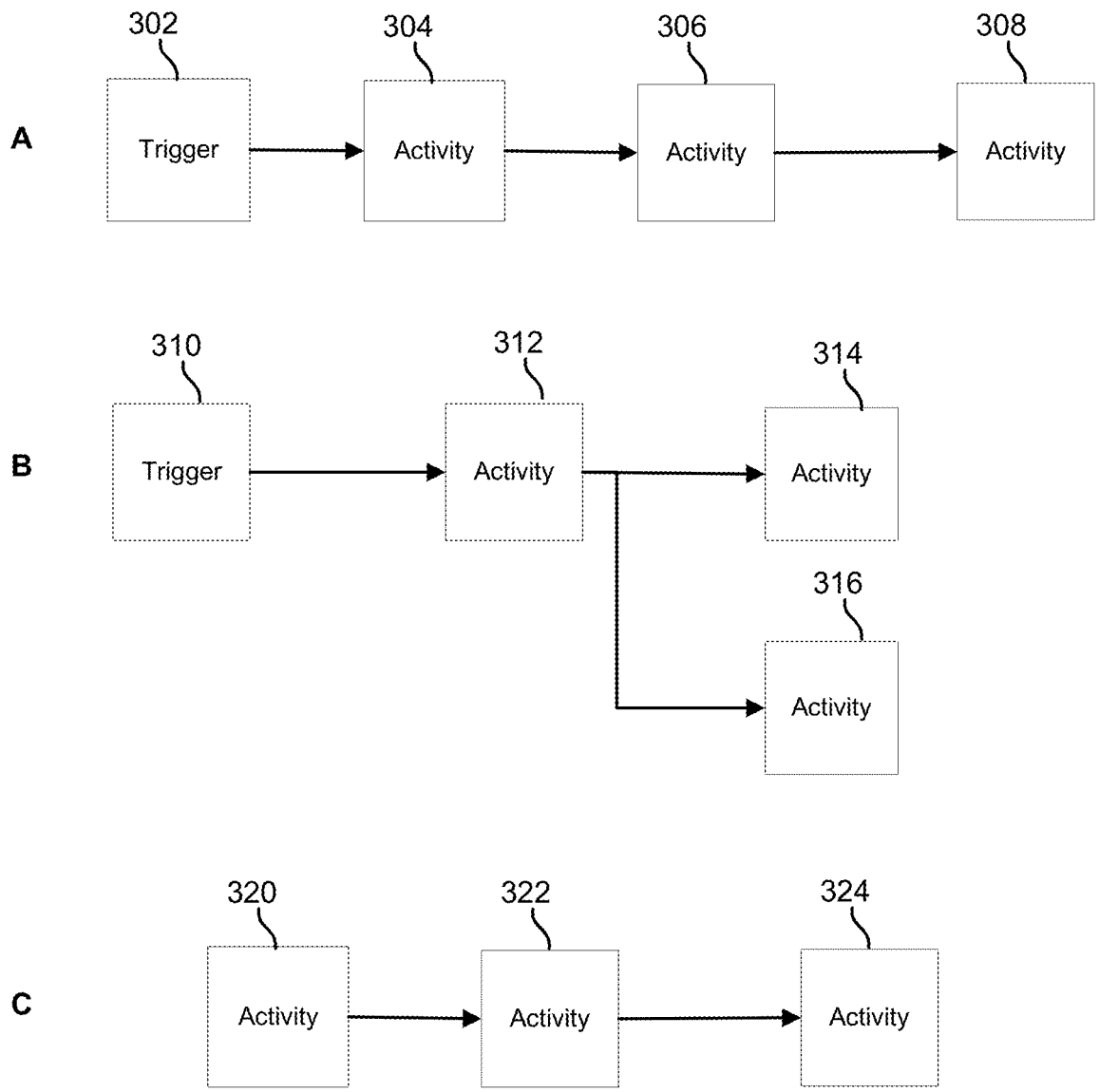
FIG. 3 is a flow chart illustrating an embodiment of a process application.

FIG. 3 is a flow chart illustrating an embodiment of a process application. In some embodiments, process application 300 can be developed using a process application development workspace, such as process application development workspace 205. In other embodiments, process application 300 can be diagnosed using a process application diagnosing workspace, such as process application diagnosing workspace 215.

A process application is comprised of one or more process flows. In some embodiments, a process flow is comprised of a trigger and one or more activities. In some embodiments, is comprised of one or more activities and is associated with a trigger that is not part of the process flow definition. Non-limiting examples of activities include a counter activity, a log activity, a rest activity, a Constrained Application Protocol (CoAP) activity, and a Hyper Text Transfer Protocol (HTTP) activity.

A deployed process engine invoking a process application may produce an erroneous result. For example, an activity of a process flow may use an output from a third party software as an input. The third party software may be updated such that the third party software outputs a different value, i.e., a different input value to the activity. As a result, the activity outputs a different state value than the activity is expected to output.

In the example shown, the process application 300 includes a process flow A and a process flow B. Process flow A is comprised of a series of steps that begins with trigger 302 and is proceeded by activity 304, activity 306, and activity 308. Process flow B is comprised of a series of steps that begins with trigger 310 and is proceeded by activity 312, activity 314, and activity 316. Process flows generally begin with a trigger and are followed by one or more activities that use the output of preceding triggers and activities as inputs.

Process flow A is an example of a sequential process flow. Process flow A can be developed in a process application development platform. Process flow A can also be recreated by a process application diagnosing workspace based upon a retrieved flow definition associated with a process engine deployed to a device and retrieved state information associated with an instance of a process engine executed on the device. At a first step of the process flow, trigger 302 may output a state value that is inputted to activity 304. At a second step of the process flow, activity 304 may output a state value that is inputted to activity 306. At a third step of the process flow, activity 306 may output a state value based on the output of activity 304. At a fourth step of the process flow, activity 308 may output a state value based on the output of activity 306. Each activity may output a state value based on one or more input data values in addition to the output of a proceeding activity or trigger. For example, the state value outputted by activity 304 may be based on the output of trigger 302 and one or more additional input data values. The one or more additional input data values can be adjusted to adjust the state value outputted by activity 304.

The one or more additional input data values associated with an activity can be adjusted in a process application development workspace. For example, it may be desirable for activity 306 to output a particular state, but for some reason, activity 306 does not output the desired state. In some embodiments, activity 306 may not output the desired state because of the state value associated with activity 304 causes activity 306 to output a value that is different from the desired state. Process application development workspace is configured to receive an input that adjusts the one or more input data values associated with activity 304 and to simulate from the second step the process flow with the one or more adjusted input data values. For example, at step two, activity 304 is configured to output a state of "X". At step three, activity 306 receives the state of "X" and outputs a state of "A." At step four, activity 308 receives the state of "A" and outputs a state of "B." One or more input data values associated with activity 304 can be adjusted such that activity 304 is configured to output a state of "Y." At step three, activity 306 receives the state of "Y" and outputs a state of "C." At step four, activity 308 receives the state of "C" and outputs a state of "D." Process application development workspace enables an integrator to determine the impact of adjusting the state of activity 304 without having to start the process flow from step one. This reduces the amount of time needed to diagnose a failed instance of a process application because system resources do not need to be used to run the steps that precede the selected step. In some instances, a process application is comprised of hundreds of steps and running a process application from the beginning requires more computing resources than running a process application from a selected step, e.g., from the middle/towards the end of the process application. The process application development platform is also configured to save the modified version of the process flow.

Process flow B is an example of process flow with multiple paths. Process flow B can be developed in a process application development platform. Process flow B can also be recreated by a process application diagnosing workspace based upon a retrieved flow definition associated with a process engine deployed to a device and retrieved state information associated with an instance of a process engine executed on the device to enable an operator to adjust one or more input variables associated with a trigger or activity to cause the associated trigger or activity to produce a desired state.

In the example shown, at step two, activity 312 may output a state that causes activity 314 at step three to output a state value, but does not cause activity 316 at step three to output a state value. Activity 312 may have originally been programmed to output a state value that causes activity 316 to output a state value. One or more input data values associated with activity 312 can be adjusted that causes activity 316 to output a state value. Process application diagnosing workspace enables an operator to determine the impact of adjusting the state of activity 312 without having to start the process flow from step one. This reduces the amount of time needed to diagnose a failed instance of a process application because system resources do not need to be used to run the steps that precede the selected step. In the example shown, the process flow can be started from step two with the modified inputs.

Process flow C is an example of a process flow without a trigger. Process flow C is comprised of activities 320, 322, and 324. Process flow C can be associated with a trigger (not shown), but the trigger is not part of the definition of process flow C. Process flow C is similar to process flow A except that a trigger is not part of the process flow C's definition.

Figure 4:
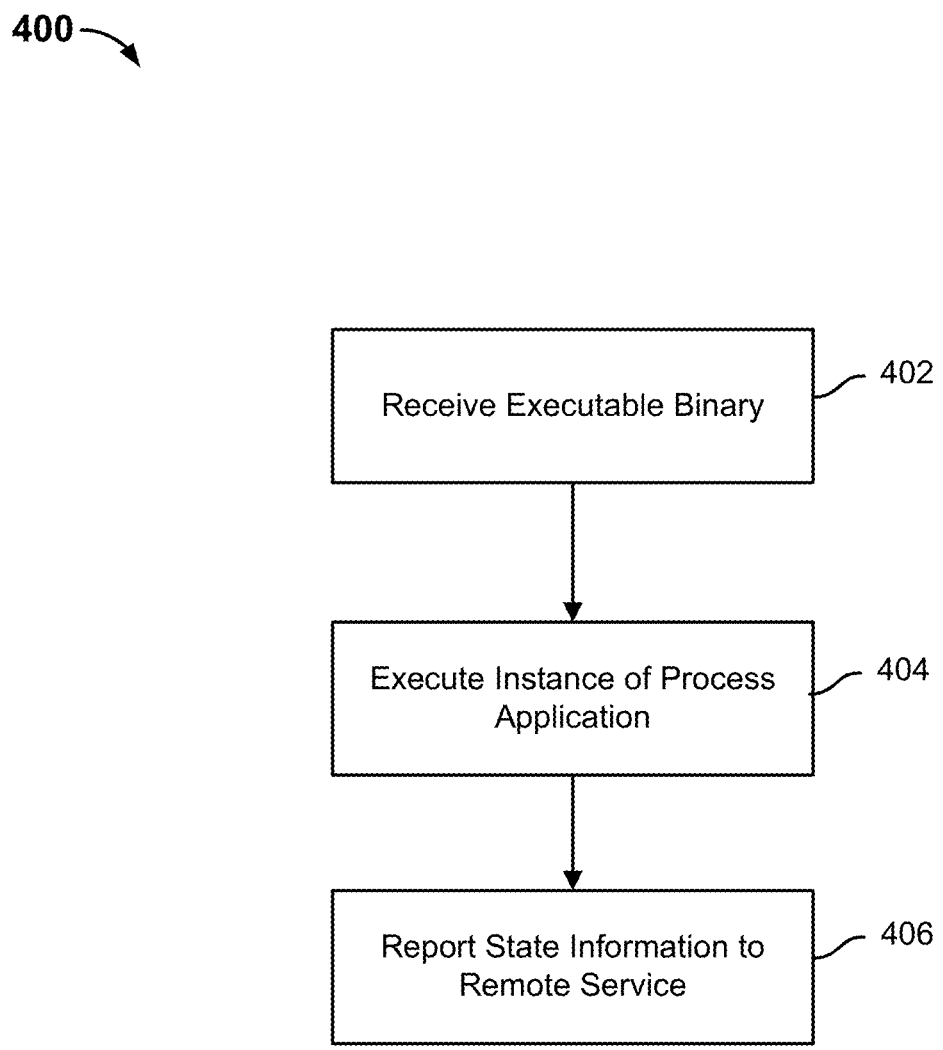
FIG. 4 is a flow chart illustrating an embodiment of a process for reporting state information associated with a process application executed by a process engine running on a device.

FIG. 4 is a flow chart illustrating an embodiment of a process for reporting state information associated with a process application executed by a process engine running on a device. In some embodiments, the process 400 of FIG. 4 can be implemented by a device, such as device 118.

At 402, an executable binary is received. The executable binary, when executed on the device, is a process engine that controls how the device operates. The process engine is comprised of a process application.

At 404, an instance of a process application is executed on a device. After each step of the process application, the state information associated with each step is stored on the device.

At 406, state information is reported to a remote service database. The state information includes an identifier associated with a device and a timestamp of when associated state information changed. In some embodiments, the device stores state transitions after each step of a process application is completed. In some embodiments, the device transmits the state transitions to a state information database after each step of a process application is completed. In other embodiments, the device periodically transmits the state transitions to the state information database. In other embodiments, the device transmits the state transitions to state information database upon request. In some embodiments, when the device loses connectivity to a network, the device transmits the state transitions to the state information database upon re-establishing connectivity to the network.

Figure 5:
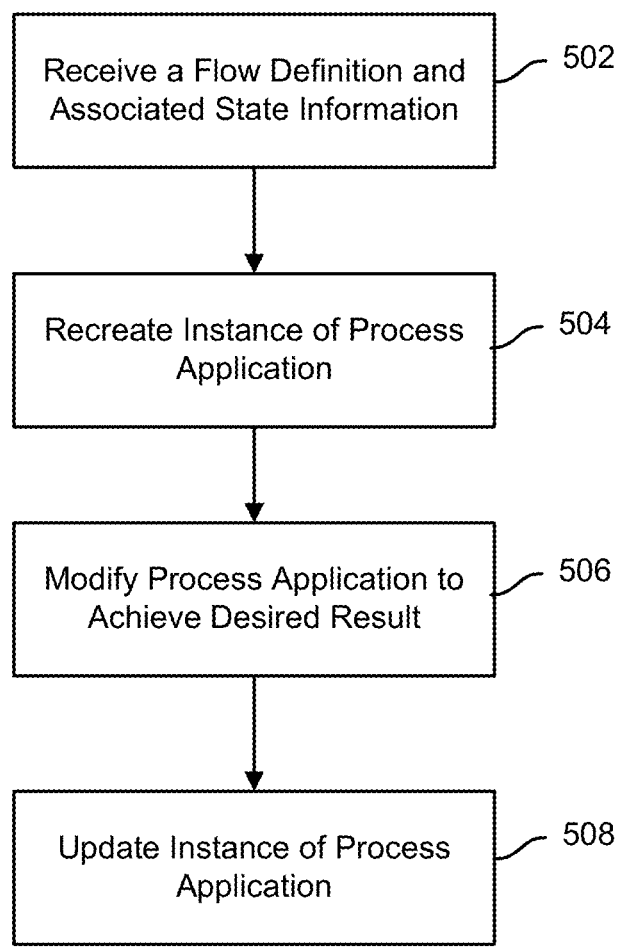
FIG. 5 is a flow chart illustrating an embodiment of a process for diagnosing a process application.

FIG. 5 is a flow chart illustrating an embodiment of a process for diagnosing a process application. In some embodiments, the process 500 of FIG. 5 can be implemented by a process application diagnosing platform, such as process application diagnosing platform 112.

In the example shown, process 500 begins at 502 where a flow definition associated with a process engine deployed to a device and state information associated with an instance of the process engine deployed to the device are received. In some embodiments the flow definition is received from a remote database and the state information associated with an instance of a process engine deployed to the device is received from a separate remote database. The flow definition describes the behavior of a process application executed by a process engine and includes the one or more process flows associated with the process application. The state information describes the state of a process application, as executed by a process engine, at each step and includes state values associated with the trigger and activities of a process flow at each step.

At 504, an instance of the process application executed by the process engine deployed to the device is recreated. When recreated, the process application can be run from any step and the associated state values can be determined.

At 506, the process application is modified to achieve a desired output. For example, any step of the process application can be selected and the one or more input data values associated with the selected step can be modified to adjust the output state of the selected step. The impact of the selected step adjustments on the state of subsequent steps can be determined. In some embodiments, a definition associated with an activity or trigger can be modified to produce a desired output result.

At 508, the process application is updated to reflect the changes that cause the process application to achieve the desire result and stored in memory. The updated process application includes a data record that is comprised of the one or more modified data values that are used by a trigger and/or activity to produce the desired output.

Figure 6:
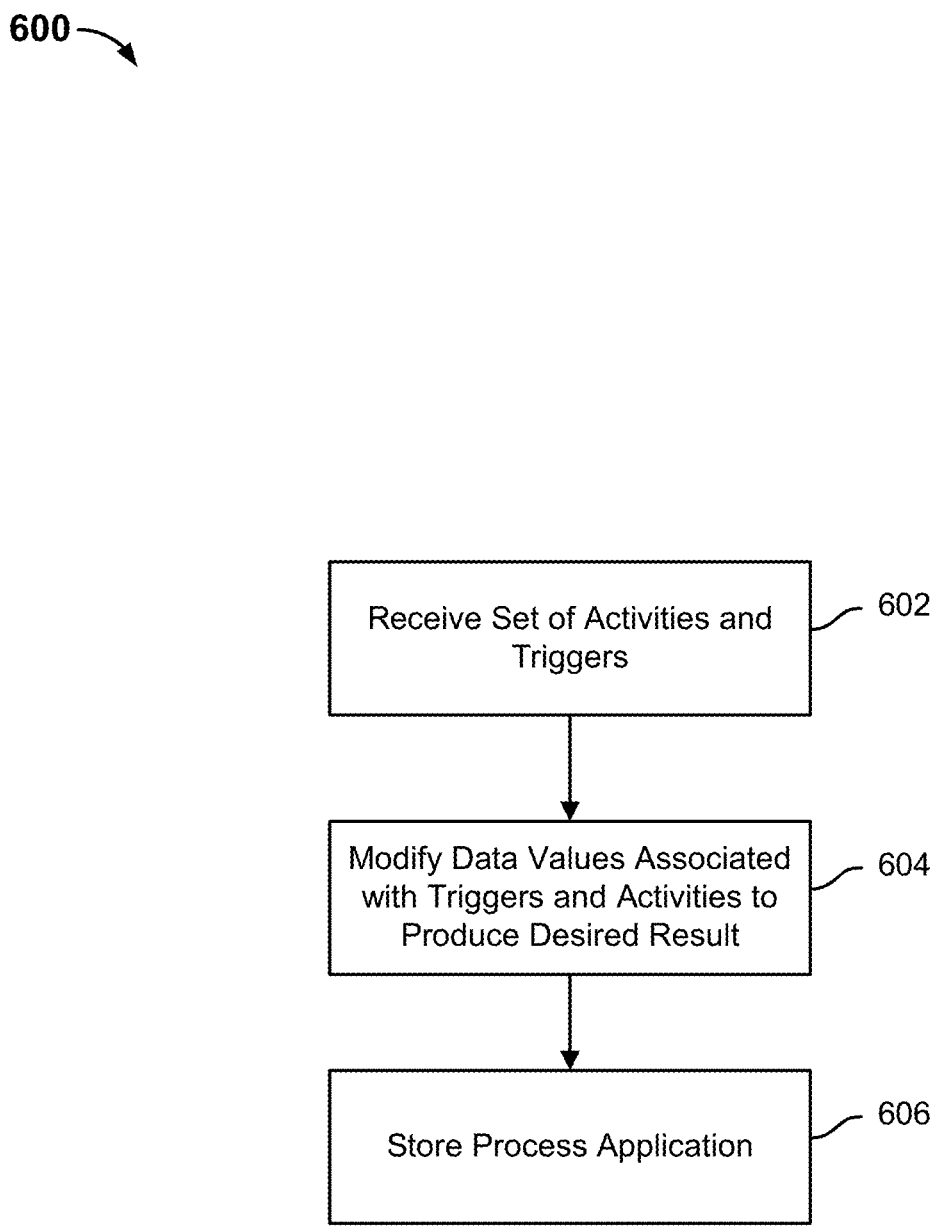
FIG. 6 is a flow chart illustrating an embodiment of a process for developing a process application.

FIG. 6 is a flow chart illustrating an embodiment of a process for developing a process application. In some embodiments, process 600 of FIG. 6 can be implemented by a process application development platform, such as process application development platform 110.

In the example shown, process 600 begins at 602 where a set of activities and triggers are received to create one or more process flows of the process application. An integrator is provided with the ability to select activities and triggers via a user interface, such as for example, a Flogo® interface. In some embodiments, the integrator is provided with a list of available activities and triggers and selects one or more activities and triggers from the list. In other embodiments, the integrator is able to search for available activities and triggers from a local database and selects one or more activities from the search results of the search. In other embodiments, the integrator is able to search a remote database for available activities and triggers and selects one or more activities and triggers from the remote database. In other embodiments, the integrator via a command line interface is able to search for available activities and triggers and select one or more activities and triggers.

At 604, one or more input data values associated with the triggers and/or activities of the process application are modified to produce a desired state. For example, any step of the process application can be selected and the one or more input data values associated with the selected step can be modified to adjust the output of the selected step. The impact of the selected step adjustments on the state of subsequent steps can be determined.

At 606, the process application is stored. In some embodiments, the process application is stored to a local database. In other embodiments, the process application is stored to a remote database.

Figure 7:
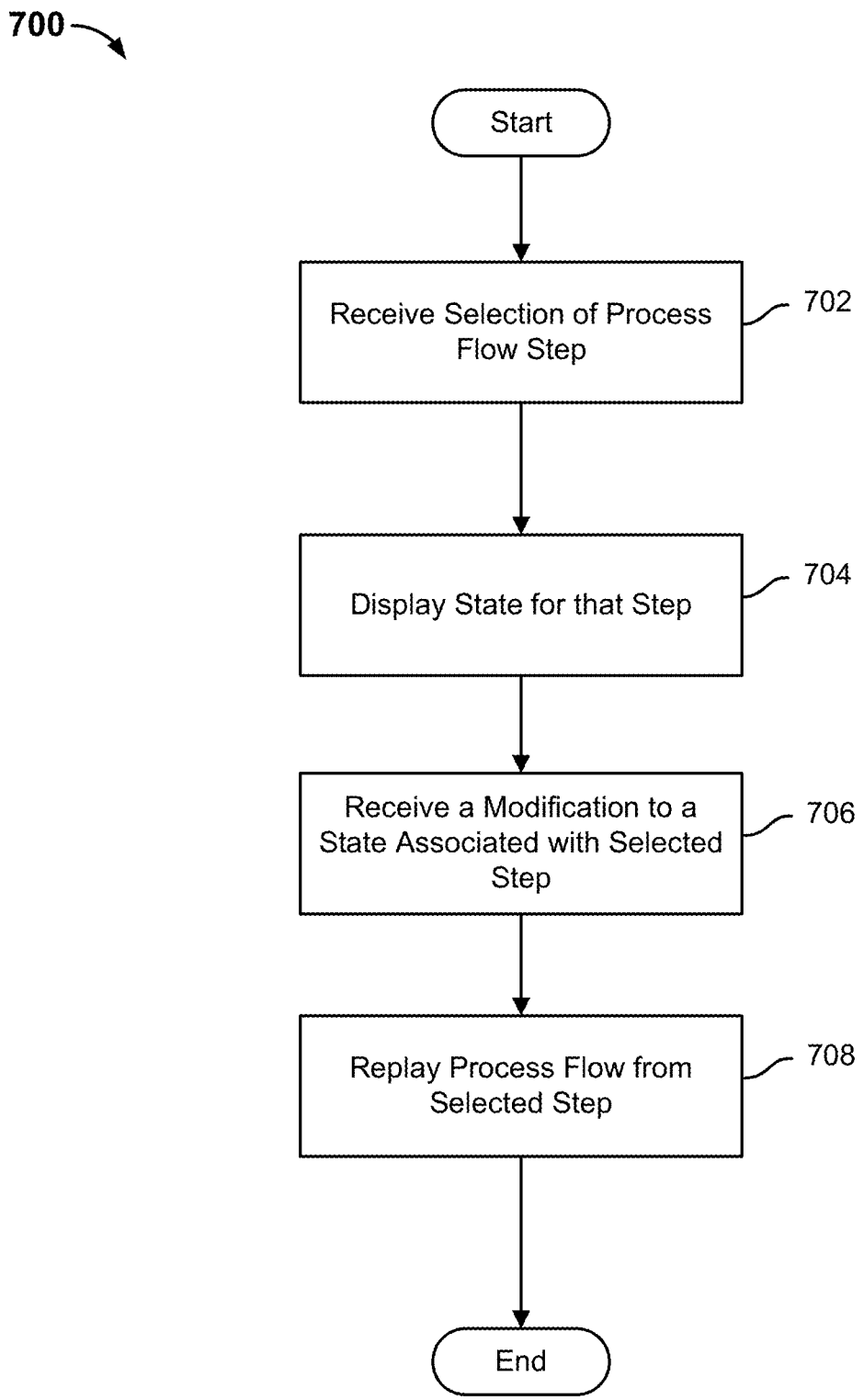
FIG. 7 is a flow chart illustrating an embodiment of a process for modifying a process application.

FIG. 7 is a flow chart illustrating an embodiment of a process for modifying a process application. In some embodiments, process 700 of FIG. 7 can be implemented by a process application diagnosing platform, such as process application diagnosing platform 112. In other embodiments, process 700 can be implemented by a process application development platform, such as process application development platform 110. In some embodiments, the process of FIG. 7 can be implemented to perform a portion of step 506 or step 604.

In the example shown, process 700 begins at 702 where a selection of step of a process flow is received. The process flow is comprised of 1 to n steps that begins at step 1 and completes at step n. At each step of the process flow, the associated trigger or activity has an associated state value. Any step of the process flow can be selected.

At 704, a state value associated with each step is displayed. In some embodiments, the state value of any step at any point in time when the process engine is running can be displayed.

At 706, a state associated with the selected step is modified. For example, the state of a selected step is based on one or more input data values. The state of the selected step can also be based on an output of a preceding step. The one or more input data values can be modified to adjust the output state of the selected step.

At 708, the process flow can be executed from the selected step with the modified input variable. For example, the process flow does not need to be executed from step 1. Rather, it can be executed from the selected step that was modified and the changes to state values associated with subsequent steps can be observed. In some embodiments, the process flow can be executed to the end without interruption. The state values associated with each of the process steps can be displayed. In other embodiments, the process flow is executed on a step by step basis. The process flow can proceed to a subsequent step of the process flow in response to a user input received from a user interface. The output state at each step can be displayed. In some embodiments, the process flow can be executed to the end, but can be interrupted at any time via an user input received from the user interface. The output state at each step at the time of the interrupt can be displayed.

Figure 8:
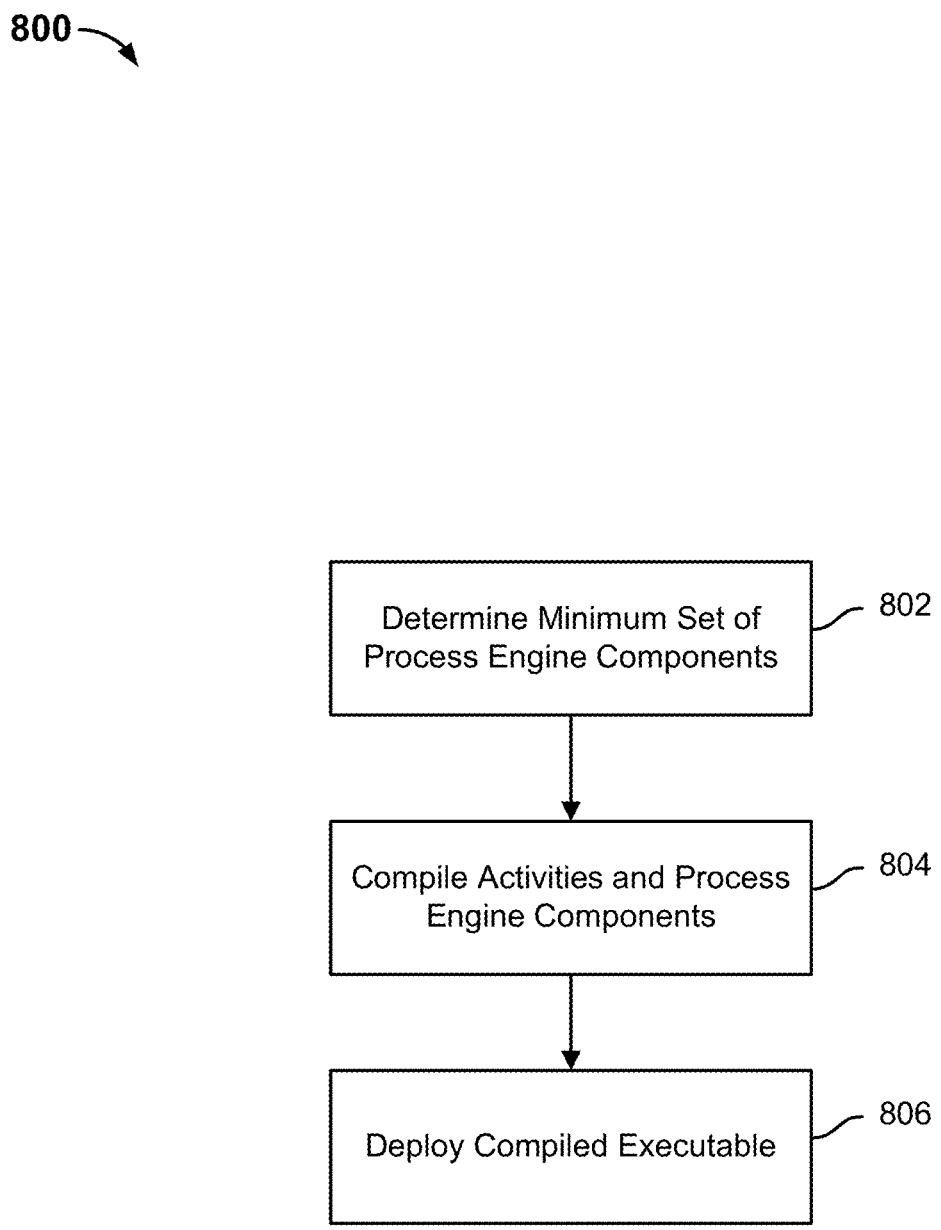
FIG. 8 is a flow chart illustrating an embodiment of a process for deploying a process.

FIG. 8 is a flow chart illustrating an embodiment of a process for deploying a process engine. In some embodiments, process 800 of FIG. 8 can be implemented by a process application development platform, such as process application development platform 110 or a process diagnosing platform, such as process application diagnosing platform 112.

At 802, a minimum set of process engine components for the process application is determined. The minimum set of process engine components is the minimum number of process engine components that are actually required to support the one or more process flows defined by the integrator for the process application. For example, a process flow may include a trigger and/or one or more activities that are not invoked by the flow. An activity or trigger may include components that are unused by the process application. Such activities, triggers, and components are identified and removed.

A trigger and/or activity may be associated with one or more transports necessary to carry out the process application. Examples of a transport include HTTP/HTTPS, MQTT, CoAP, etc. The transports that are actually invoked by the process application are identified and added to the process application.

At 804, the triggers and activities comprising the process application are compiled into an executable binary. In some embodiments, process engine components associated with the triggers and activities not referenced by the process application are ignored and excluded from the executable. The transports that are actually invoked by the process application are identified and added to the executable.

At 806, the executable comprising the process engine is deployed to a device. Since the unused process engine components are removed from the executable, the process engine, when executed by a device, may be brought online more quickly. In some embodiments, the executable is deployed via a wireless connection and downloaded to the device. In other embodiments, the executable is deployed to a physical memory device and transferred to the device. In other embodiments, the executable is deployed via a wired connection to the device. In some embodiments, the executable is deployed to a device that is different than the device that unexpectedly produced an erroneous output.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system for diagnosing and updating process applications instantiated on a plurality of devices, comprising:
   a processor communicatively coupled to a storage resource, wherein the processor is configured to execute application code instructions stored in the storage resource to:
   store, locally at a device, state transition information associated with an executed step of an instantiated process application instantiated by an instantiated process engine wherein the instantiated process application produced an erroneous result;
   transmit a flow definition to a remote diagnosing platform;
   receive, at the diagnosing platform, the flow definition that describes a process flow and the state transition information that describes a state of the process flow at each step of the process flow associated with the instantiated process application;
   recreate a process engine associated with the instantiated process engine of the device with the state transition information;
   modify one or more input data values associated with a selected step of the process flow;
   execute the process flow from the selected step using the modified one or more inputs;
   update at least one data record associated with the selected step of a process application to reflect the modified one or more inputs and state information associated with steps of the process flow;
   recompile the process application; and
   redeploy the process application to the device using a device identifier.

2. The system of claim 1, wherein the flow definition is a flow.json file.

3. The system of claim 1, wherein the processor is configured to reconstruct a process application based on the flow definition and the state information, wherein the process application includes the process flow.

4. The system of claim 1, wherein the processor is further configured to compile the process application into an executable.

5. The system of claim 4, wherein the processor is further configured to deploy the compiled executable to a device that produced the state information.

6. The system of claim 1, wherein the state information is stored in a database separate from a device that produced the state information and the system.

7. The system of claim 1, wherein the flow definition is stored in a database separate from the device that produced the state information, a database that stores the state information, and the system.

8. The system of claim 1, wherein a device that produced the state information uploads state values to a database that stores the state service.

9. The system of claim 8, wherein the state values are uploaded upon the occurrence of a state transition.

10. The system of claim 8, wherein the state values are periodically uploaded from the device that produced the state information to the database that stores the state information.

11. The system of claim 8, wherein in the event of a network connection failure between the device that produced the state information and the database that stores the state information, upon reconnection, the state values are uploaded to the database that stores the state information.

12. The system of claim 1, wherein the processor is configured to determine a minimal set of process engine components needed to perform a process application that includes the process flow.

13. The system of claim 1, further comprising:
   pre-compile the process application to determine a minimal set of necessary and unnecessary steps to execute the process application.

14. The system of claim 13, wherein a process step can be selected from any of the necessary steps and executed from the selected step of the necessary step.

15. The system of claim 1, wherein the process applications is deployed to a plurality of devices using a plurality of device identifiers.

16. A computer-implemented method of diagnosing and updating process applications instantiated on a plurality of devices, comprising:

storing, locally at a device, state transition information associated with an executed step of an instantiated process application instantiated by an instantiated process engine wherein the instantiated process application produced an erroneous result;

transmitting a flow definition to a remote diagnosing platform;

receiving, at the diagnosing platform, the flow definition that describes a process flow and the state transition information that describes a state of the process flow at each step of the process flow associated with the instantiated process application recreating a process engine associated with the instantiated process engine of the device with the state transition information;

modifying one or more input data values associated with a selected step of the process flow;

executing the process flow from the selected step using the modified one or more inputs;

updating at least one data record associated with the selected step of a process application to reflect the modified one or more inputs and state information associated with steps of the process flow;

recompiling the process application; and redeploying the process application to the device using a device identifier.

17. The method of claim 16, further comprising reconstructing a process application based on the flow definition and the state information, wherein the process application includes the process flow.

18. The method of claim 17, further comprising compiling the process application into an executable.

19. The method of claim 18, further comprising deploying the compiled executable to a device that produced the state information.

20. A non-transitory computer readable medium containing computer readable instructions for instructing a computing machine to diagnose and update process applications instantiated on a plurality of devices, the computer-readable instructions comprising instructions for causing the computing machine to:

store, locally at a device, state transition information associated with an executed step of an instantiated process application instantiated by an instantiated process engine wherein the instantiated process application produced an erroneous result;

transmit a flow definition to a remote diagnosing platform;

receive, at the diagnosing platform, the flow definition that describes a process flow and the state transition information that describes a state of the process flow at each step of the process flow associated with the instantiated process application;

recreate a process engine associated with the instantiated process engine of the device with the state transition information;

modify one or more inputs associated with a selected step of the process flow;

execute the process flow from the selected step based on the modified one or more inputs;

update at least one data record associated with the selected step of a process application to reflect the modified one or more inputs and state information associated with steps of the process flow;

recompile the process application; and redeploy the process application to the device using a device identifier.

* * * * *